March 6, 1956  J. DAUBEN  2,737,055
SWASH DISK MOTION-TRANSMITTING MECHANISM FOR INTERNAL
COMBUSTION ENGINES, COMPRESSORS, OR THE LIKE
Filed Jan. 4, 1952
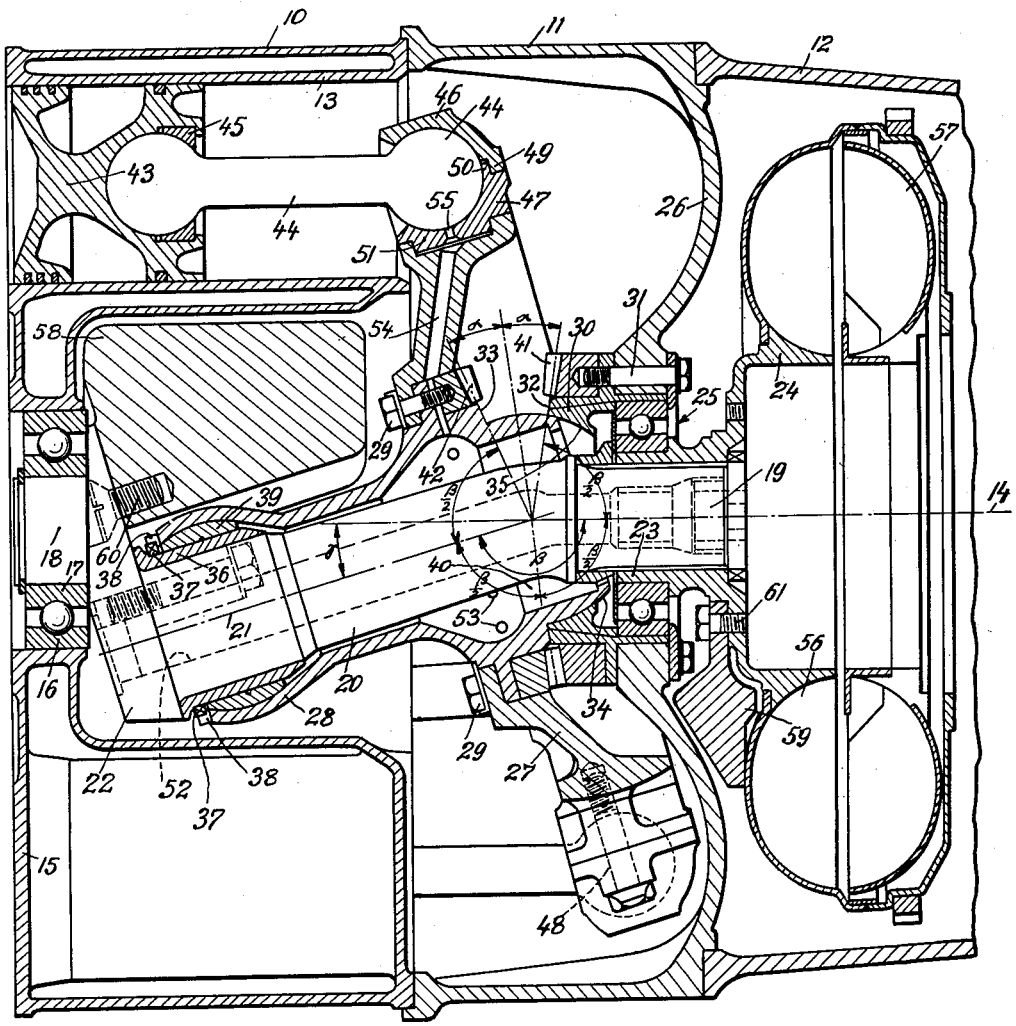
Inventor
Joseph Dauben
By Dieke and Padlon
Attorneys United States Patent Office 2,737,055
Patented Mar. 6, 1956

2,737,055

SWASH DISK MOTION-TRANSMITTING MECHANISM FOR INTERNAL COMBUSTION ENGINES, COMPRESSORS, OR THE LIKE

Joseph Dauben, Stuttgart, Germany, assignor to Daimler-Benz Aktiengesellschaft, Stuttgart-Unterturkheim, Germany Application January 4, 1952, Serial No. 264,924

Claims priority, application Germany January 5, 1951

7 Claims. (Cl. 74—60)

My invention relates to a mechanism for converting a reciprocatory motion into a rotary motion, or vice versa, by means of a swash disk, i. e. a disk performing an orbitary motion causing its axis to describe a cone.

More particularly, my invention relates to an internal combustion engine incorporating a device of that character.

Motion-transmitting mechanisms of the swash disk type are applicable with particular advantage to machines provided with a plurality of cylinders, such as internal combustion engines, compressors, or the like, said cylinders being preferably mounted in parallel relationship and distributed about the axis of the driven shaft or driving shaft, pistons reciprocating in such cylinders being co-operatively connected with the swash disk.

An internal combustion engine, a compressor, or other machine of that type having a great number of cylinders, for instance eight cylinders or more, excels by its compact structure and its light weight, a single crank pin being required only and the cylinders being so located that the admission and discharge of the operating fluid can be readily controlled by a single rotary element mounted on the crankshaft.

In numerous prior designs of machines of the swash disk type described, the bearings of the swash disk were subject to excessive wear, and it is the object of the present invention to provide a motion transfer mechanism of the swash disk type in which the axial thrust acting on the swash disk will be taken up by an improved bearing structure of great simplicity and great strength which will render excellent service even under very severe conditions.

It is another object of my invention to provide a mechanism of the character described in which considerable allowances may be permitted for the manufacture of the component parts without adversely affecting the bearings of the swash disk and of the crankshaft. More particularly, it is the object of the present invention to provide a swash disk mechanism, particularly for internal combustion engines, which can be manufactured at a low cost and excels by a reliable and rugged structure of the bearings and by a uniform transfer of motion, by a high efficiency and by the fact that the forces produced by the acceleration and deceleration of the masses are completely balanced.

Further objects of my invention will appear from the description of a preferred embodiment thereof following hereinafter, and the features of novelty will be pointed out in the claims.

In the drawing I have shown a partial axial section of an internal combustion engine embodying the novel motion-transmitting mechanism according to my invention.

The casing is composed of three substantially cylindrical sections 10, 11 and 12, the section 10 being formed with a plurality of circumferentially distributed cylinders 13, the axes of such cylinders extending at equal distances from and parallel to the axis 14 of the casing. In the center of the end wall 15 of casing section 10 there is mounted a ball bearing comprising an outer race 16 mounted in a bore of the end wall 15 and an inner race 17 mounted on a line bearing pin of a crankshaft having a second line bearing pin 19 and a crank pin 20. While the common axis of the two line bearing pins 18 and 19 coincides with the axis 14, it will be noted that the crank pin 20 is so disposed that its axis 21 intersects the axis 14 at the point O at an acute angle α. While the right hand end of the crank pin 20 merges into the line bearing pin 19, the left hand end of such crank pin is connected with the line bearing pin 18 by means of a crank arm 22. The pin 19 of the crankshaft is splined and carries the hub 23 of a fluid clutch member 24 which is journalled by means of an anti-friction line bearing 25 within a central opening of an end wall 26 of casing section 11.

On the crank pin 20 the sleeve-like hub portion 28 of a swash disk 27 is journalled by suitable means. Preferably the disk 27 is formed by an element separate from the sleeve 28 and connected to a peripheral flange thereof by screws 29.

The end wall 26 of the casing section 11 carries a co-axial annular member 30 rigidly connected thereto by screws 31. The member 30 is provided with an annular face 32 co-axial to the axis 14, and the sleeve 28 is provided with an opposite annular face 33 co-axial to the axis 21.

At least one, but preferably both, of the two faces 32 and 33 is conical having its apex coinciding with the intersection O, and the two faces will roll upon one another when the crankshaft 18, 19, 20 rotates about the axis 14.

I shall now describe how the sleeve-shaped hub 28 of the swash disk 27 is journalled upon the crank pin 20.

An external spherical bearing composed of a spherical periphery 34 on the end of sleeve 28 and a conjugate spherical face 35 on the inside of the annular member 30, both concentrical to the intersection O, will support the right hand end of the sleeve on the casing 10, 11, 12. An internal spherical bearing at the other end of the sleeve 28 supports said other end of the crank pin 20 and includes a bushing 36 on the crank pin 20 bearing against the crank arm 22 and provided with projections 37 engaging recesses 38 cut into the rim of sleeve 28, whereby the bushing 36 is connected with the sleeve 28 for common rotation. An annular bearing member 39 mounted on the bushing 36 has a spherical outer face engaging a spherical internal face of the sleeve 28. It will be noted that a substantial clearance 40 is provided between the crank pin and the right hand end of the sleeve 28.

Means are provided which will prevent the swash disk 27 from rotation about axis 14. Such means preferably comprise a pair of meshing bevel gears, one gear 41 being rigidly connected with the casing 10, 11, 12 preferably by means of the screws 31, whereas the other gear 42 is mounted on the peripheral flange of the sleeve 28 by means of the screws 29. It will be noted that the apex of each of the two bevel gears 41 and 42 coincides with O.

Means are provided to impart an orbital motion to the swash disk 27 and its sleeve-shaped hub 28 causing the latter to impart rotation to the crankshaft 18, 19, 20. Such means include a plurality of pistons 43 mounted for reciprocation in the cylinders 13 and co-operatively connected with the swash disk 27 by connecting rods 44. The connecting rods have preferably universal joints connecting them with the pistons and the swash disk. In the embodiment shown the universal joints are designed as ball joints, each connecting rod 44 being formed with two balls, one being held in a spherical recess of the piston by a ring 45 and the other one being embraced by a pair of bearing members 46 and 47 which are connected by screws 48 to one another and to the swash disk 27. These bearing members are preferably castings or forgings of aluminum or another light metal.

They are preferably formed with mutually engaging flanges 49 and 50 ensuring relative alignment. Moreover, the member 47 is provided with a cylindrical projection 51 fitted into a circular recess provided in the periphery of the swash disk 27. In this manner, the screws 48 will be subject to a tensional stress only. For the purpose of reducing such stress the screws 48 are placed in an eccentrical position with respect to the cylindrical projection 51 closer to the associated piston 43.

The two bearing members 46 and 47 may be die-forged so as to save the necessity of a subsequent machining operation.

It will be noted that the distance of the center of each of the bearings constituted by the member 46, 47 from the axis 21 equals substantially the distance of the two spherical bearings 34, 35, and 36, 28, measured from center to center.

A suitable lubricating system is provided in the customary manner supplying oil to an internal bore 52 of the crankshaft whence it is guided through suitable radial bores not shown to the circumference of the bushing 36. From there the oil will get into the clearance 40 and thence through radial bores 53 of sleeve 28 and through ducts 54 provided in the swash disk 27 and through bores 55 into the spherical bearings formed by the members 46 and 47. Some of the oil will pass from the clearance 40 to the spherical faces 35 and 34 to lubricate same.

The fluid clutch member 24 is formed with vanes 56 and may co-operate with a driven clutch member 57 geared to the wheels of a vehicle or the like through a suitable transmission.

In order to balance the centrifugal forces, I preferably equip the crankshaft with two properly proportioned counterweights 58 and 59. Preferably the weight 58 attached by a screw 60 to the inner face of the crank arm 22 is considerably heavier than the counterweight 59 attached by screws 61 to the member 23 within the casing section 12. With a proper proportion of the counterweights, the forces produced by the rotating and reciprocating masses will be completely balanced so that the engine will run smoothly without any material vibration.

The conical faces 32 and 33 have preferably the same cone angle $\beta$ which amounts to $180° - \alpha$.

Since the swash disk 27 is supported against the axial piston thrust by the co-operation of the faces 32 and 33, the spherical bearing 34, 35 need not transfer any such axial thrust, but serves the sole purpose of axially aligning the swash disk with respect to the axis 14.

The bevel gears 41 and 42 may be spiral bevel gears having a spiral angle causing the tooth pressure to counteract the radial component of the piston thrust acting on the swash disk 27. Owing to the clearance 40, an ample allowance is permissible for the component parts of the machine since a possible misalignment between the line bearing 19 and the center of the spherical bearing 34, 35 will do no harm, the sleeve-shaped hub 28 of the swash disk 27 being capable of self-adjustment by a pivotal motion about the center of the spherical bearing 39. Thus, the spherical bearing 39 serves the purpose of preventing any undue concentration of bearing pressure in event of such inaccuracies.

The mechanism described has an excellent mechanical efficiency superior to that of any other engine, particularly inasmuch as the pistons are hardly subject to any transverse forces. Moreover, the described design has the advantage that all the pistons 43 and connecting rods 44 will perform exactly similar motions in accurately timed relationship, whereby the swash disk will perform an exactly uniform orbital motion resulting in a perfect balancing of the forces produced by the rotating and reciprocating masses.

The cylinder head of the engine has been omitted in the drawing for sake of simplicity and may be any well known design.

While my invention has been shown as applied to an internal combustion engine, it is capable of use for numerous other purposes, for instance it may be applied to compressors, pumps, etc.

While I have described a preferred embodiment of my invention, I wish it to be clearly understood that the same is in no way limited to the details thereof, but is capable of numerous modifications within the scope of the appended claims.

What I claim is:

1. In a machine of the character described, the combination comprising a crankshaft having a crank pin, the axis of the latter intersecting the line bearing axis of said crankshaft, a casing, two line bearings attached to said casing and rotatably supporting said crankshaft including said crank pin against axial displacement, a swash disk having a hub surrounding and co-extensive with said crank pin, bearing means on said casing and on one end of said hub and constituting a first spherical bearing therebetween concentric with the intersection of said axes, and a second spherical bearing provided between the other end of said hub and said crank pin, said one end of said hub being spaced from and out of contact with said crankshaft and supported thereon by said second spherical bearing only.

2. In a machine of the character described, the combination comprising a crankshaft having a crank pin, the axis of the latter intersecting the line bearing axis of said crankshaft, a casing, two line bearings attached to said casing and rotatably supporting said crankshaft, including said crank pin against axial displacement, a swash disk having a hub surrounding and co-extensive with said crank pin, bearing means on said casing and on one end of said hub and constituting a first spherical bearing therebetween concentric with the intersection of said axes, and a second spherical bearing provided between the other end of said hub and said crank pin, said casing and said swash disk being formed with conjugate annular faces rolling upon one another and adapted to transfer the thrust between said pistons and said casing, at least one of said faces being conical having its apex coinciding with said intersection, said one end of said hub being spaced from and out of contact with said crankshaft and supported thereon by said second spherical bearing only.

3. In a machine of the character described, the combination comprising a crankshaft having two line bearing pins and an intermediate crank pin having an axis intersecting the axis of said line bearing pins, a casing, two line bearings attached to said casing rotatably supporting said line bearing pins and said crank pin against axial displacement, said casing being formed with a conical annular face co-axial with said line bearings, a sleeve surrounding said crank pin formed with a coaxial annular conical face having its apex coinciding with the intersection of said axes and adapted to bear against and to roll upon said first mentioned conical annular face, an external spherical bearing at one end of said sleeve supporting the latter on said casing and disposed concentrically to said intersection, an internal spherical bearing at the other end of said sleeve supporting said other end on said crank pin, a clearance being provided between said crank pin and said first mentioned end of said sleeve, a pair of meshing bevel gears, one being attached to said casing and the other one to said sleeve having their apex coinciding with said intersection, and means adapted to impart an orbital motion to said sleeve causing the latter to impart rotation to said crankshaft, said means including a member surrounding and rigid with said sleeve.

4. The combination claimed in claim 3 in which each of said conical faces has a cone angle equalling the obtuse angle of intersection of said axes.

5. The combination claimed in claim 3 in which said bevel gears have spiral teeth, the spiral angle of said teeth being so correlated to the bearing pressure in said external spherical bearing as to produce a thrust counteracting such bearing pressure.

6. In a machine of the character described, the combination claimed in claim 1 comprising in addition two counterweights attached to said crankshaft at either end thereof, the counterweight adjacent to said first spherical bearing being heavier than the counterweight provided adjacent to said second spherical bearing.

7. In a machine of the character described, the combination comprising a crankshaft having a line bearing axis and a crank pin extending at an acute angle to said axis, a casing, means for rotatably supporting said crankshaft including said crank pin in said casing against axial displacement, a swash disk having a hub surrounding said crank pin with a clearance therebetween, an external spherical bearing substantially coinciding with the center of said swash disk for mounting the latter on said casing, and an internal spherical bearing in said hub spaced a fixed distance from said first mentioned spherical bearing and serving to journal said hub on said crank pin.

References Cited in the file of this patent

UNITED STATES PATENTS

| | | |
|---|---|---|
| 575,991 | Schonheyder | Jan. 26, 1897 |
| 1,316,679 | Brackett | Sept. 23, 1919 |
| 1,512,328 | Bell | Oct. 21, 1924 |
| 1,787,493 | Redrup | Jan. 6, 1931 |
| 2,009,495 | Hulsebos | July 30, 1935 |
| 2,028,557 | Nevatt | Jan. 21, 1936 |
| 2,257,258 | Hulsebos | Sept. 30, 1941 |

OTHER REFERENCES

"Automobile Engineer," page 255, July 1947.